Figure 1:
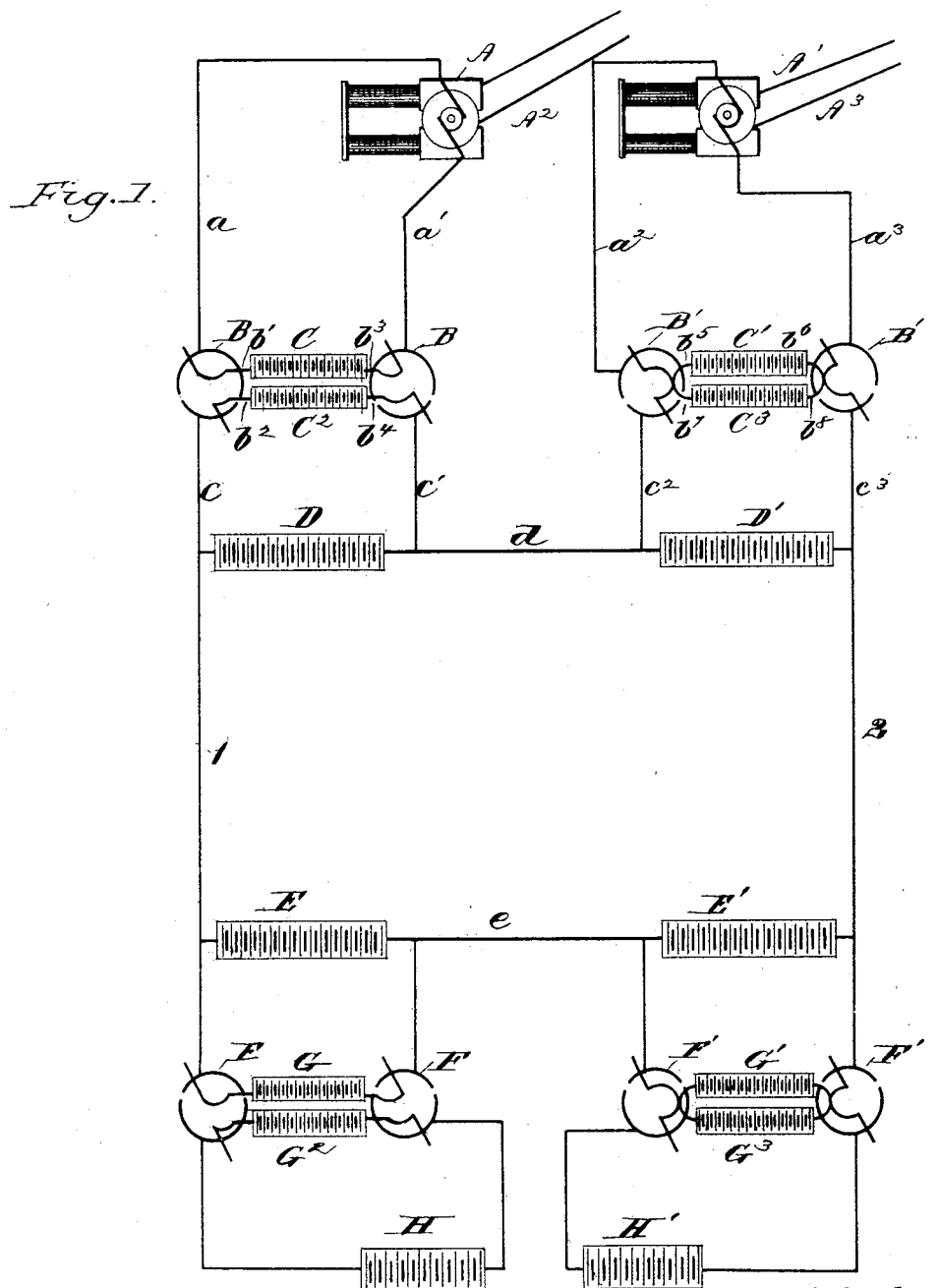

(No Model.) 3 Sheets—Sheet 1.

S. C. C. CURRIE.
SYSTEM OF TRANSMITTING AND DISTRIBUTING ELECTRICITY.

No. 401,255. Patented Apr. 9, 1889.

Witnesses,
Albert B. Blackwood
L. Paul.

S. C. C. Currie,
Inventor,
By his Attorneys

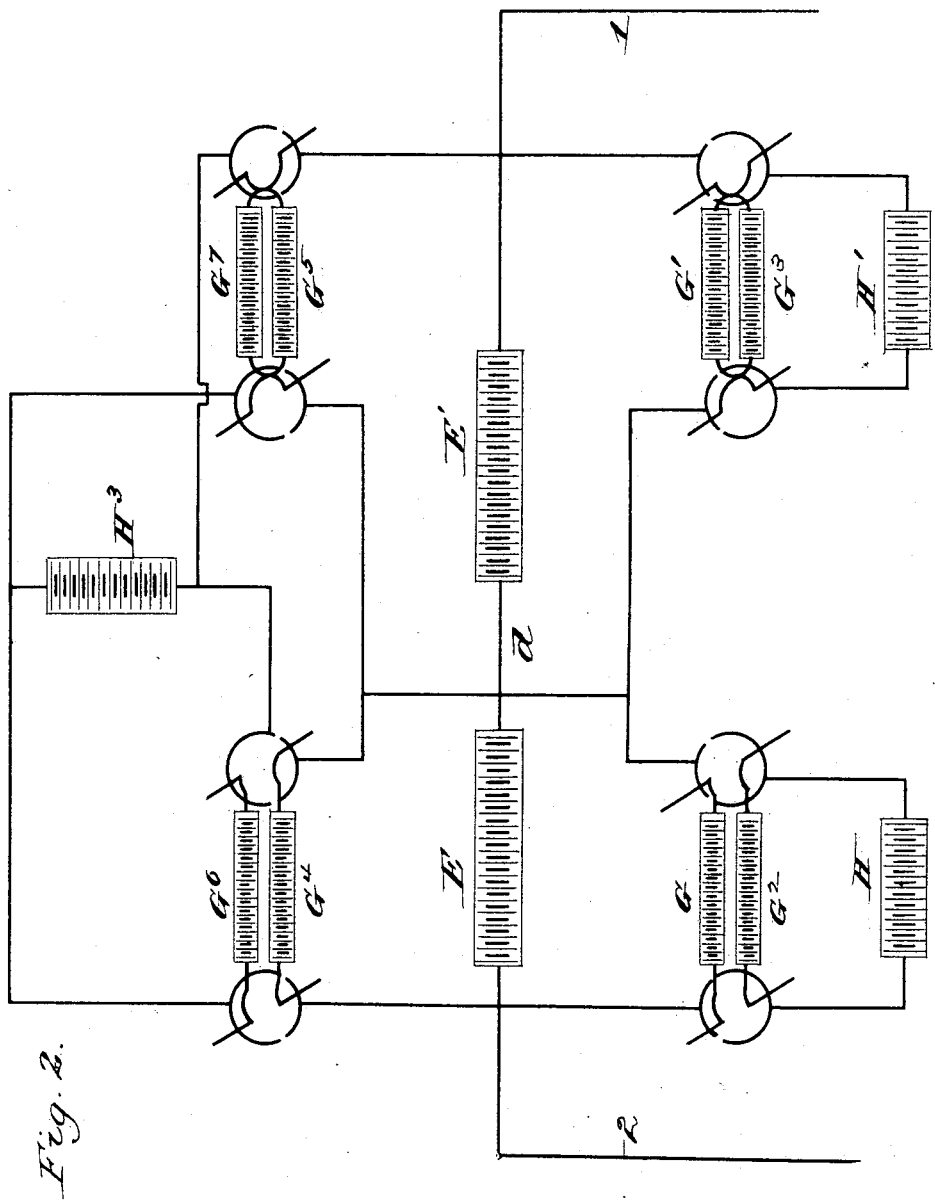

(No Model.) 3 Sheets—Sheet 3.
S. C. C. CURRIE
SYSTEM OF TRANSMITTING AND DISTRIBUTING ELECTRICITY.
No. 401,255. Patented Apr. 9, 1889.
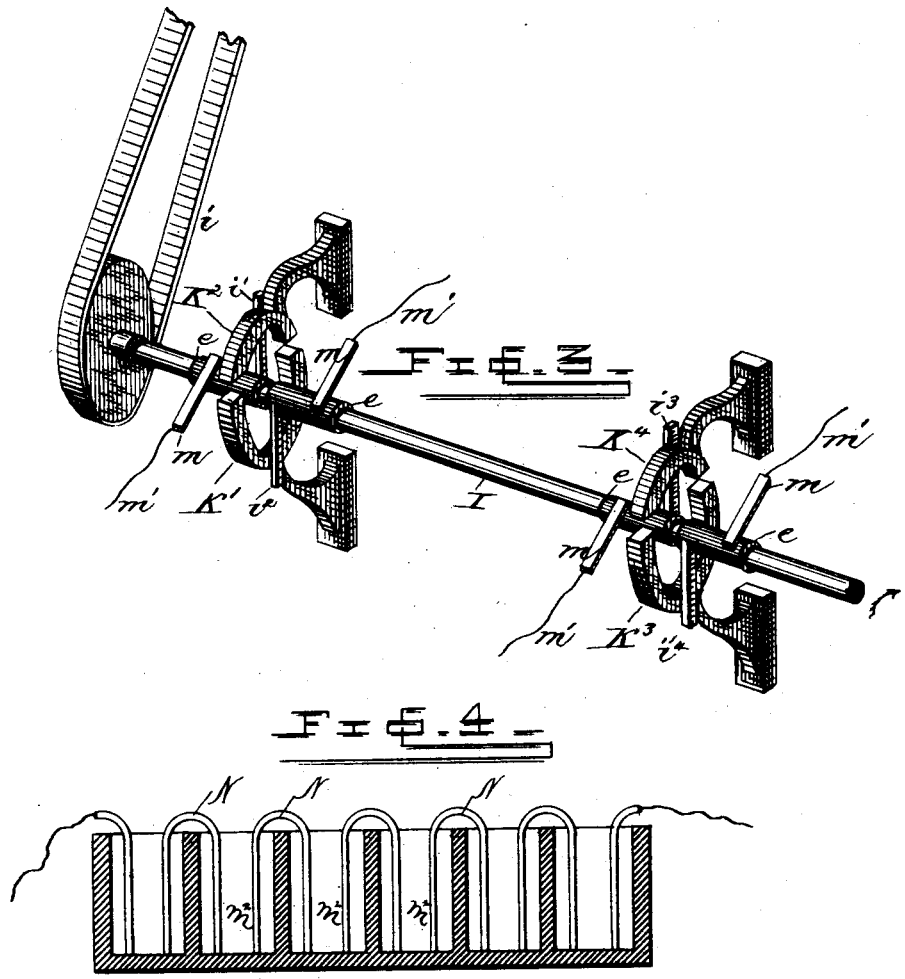
Witnesses.
A. B. Blackwood.
L. Paul.
Inventor.
S. C. C. Currie
By his Attorneys

UNITED STATES PATENT OFFICE.

STANLEY C. C. CURRIE, OF PHILADELPHIA, PENNSYLVANIA, ASSIGNOR TO THE UNITED ELECTRIC IMPROVEMENT COMPANY, OF GLOUCESTER CITY, NEW JERSEY.

SYSTEM OF TRANSMITTING AND DISTRIBUTING ELECTRICITY.

SPECIFICATION forming part of Letters Patent No. 401,255, dated April 9, 1889.

Application filed August 23, 1888. Serial No. 283,518. (No model.)

*To all whom it may concern:*

Be it known that I, STANLEY C. C. CURRIE, a subject of the Queen of Great Britain, residing at Philadelphia, in the county of Philadelphia and State of Pennsylvania, have invented certain new and useful Improvements in Systems of Transmitting and Distributing Electricity; and I do hereby declare the following to be a full, clear, and exact description of the invention, reference being had to the accompanying drawings, which form part of this specification.

My present invention has relation to methods of transmitting and distributing electricity, and my invention contemplates the transmission of a large supply of electricity of very high electro-motive force over main conductors of considerable length, and is specially applicable to cases where a source of power that may be economically utilized is situated at considerable distance from a point of consumption, as where an available water-power is at such distance from a large town that, for the attainment of the commercially best results, the electric generators must be arranged in the vicinity of the water-power, and the electricity conveyed from thence to the town at a high pressure or high electro-motive force.

Whatever care may be taken, there is constantly danger to human and animal life where currents of high potential are conveyed, and in systems of electrical distribution heretofore proposed and contemplating the supply of electricity for domestic lighting, or consumption, or public lighting, or for power, or propulsion of vehicles in public streets, wherein the electric current is at any point of the system of high intensity or electro-motive force the danger to life is great and unceasing.

In carrying my invention into effect I propose to absolutely electrically isolate all parts of the system wherein the current of dangerously high electro-motive force or pressure is maintained and to distribute to points of consumption only by currents of such low electro-motive force as to obviate danger of injury to life through accidental contact with conductors conveying such currents.

My invention consists in the novel method, hereinafter described, of generating, conveying, and distributing electricity, and in carrying my invention into effect I employ certain novel apparatus illustrated in the accompanying drawings.

In the drawings, Figure 1 is a plan view of a plant comprising electric generators, circuits, and accumulators, and circuit-changers constructed and arranged to carry out my improved method. Fig. 2 is a similar view of a modification of a portion of the plant illustrated in Fig. 1. Fig. 3 is a perspective view of the rotary circuit-changer employed in connection with the apparatus illustrated in Figs. 1 and 2; and Fig. 4 is a vertical sectional view of the secondary battery which I prefer to employ.

In the drawings, A A′ designate electric generators, the armatures of which receive motion from any available source of power by belts $A^2$ $A^3$. Conductors $a$ $a'$ $a^2$ $a^3$ lead from the generators A A′ to circuit-changers B B′, and conductors $b'$ $b^2$ $b^3$ $b^4$ $b^5$ $b^6$ $b^7$ $b^8$ electrically connect the circuit-changers B B′ with four sets of accumulators or storage-batteries, C C′ $C^2$ $C^3$, and conductors $c$ $c'$ $c^2$ $c^3$ connect the circuit-changers B B′ with two other sets of accumulators or secondary batteries, D D′.

The circuit-changers B B′ are so constructed and arranged as to alternately connect the storage-batteries C $C^2$ and C′ $C^3$ with the generators A A′ and with the storage-batteries D D′, so that as the batteries C C′ are being charged from the generators the batteries $C^2$ $C^3$ are discharging into the batteries D D′, and vice versa, it being noted that there is never at any time any complete circuit between the generators A A′ and the storage-batteries D D′.

1 and 2 designate, respectively, the main conductor of the plant and the return-circuit of the same. As these conductors are intended to convey the entire electrical current from the generating-station to the distributing-station, and as I propose in practice to convey over the conductors currents of many thousand volts of electro-motive force, they should be well and carefully insulated and isolated from possible contact with other conductors.

The conductors 1 2 electrically connect with the terminals of the secondary batteries D D', and the latter are in series as regards said conductors, being connected by a conductor, $d$, and at the distributing-station similar secondary batteries, E E', are arranged in series upon the same lines 1 and 2, being electrically connected by a conductor, $e$. At the distributing-station are arranged circuit-changers F F', corresponding to the circuit-changers B B', and secondary batteries G G' G² G³, corresponding to the secondary batteries C C' C² C³ of the generating-station.

H H' designate secondary batteries occupying the same position relatively to the circuit-changers F F' that the generators A A' occupy with relation to the circuit-changers B B'.

From the above it will be noted that the arrangement of devices at the distributing-station is exactly the same as that at the generating-station, with the exception that the secondary batteries H H' take the place of the generators A A'. It should be observed that at the distributing-station, when the batteries G G' are connected with the batteries E E', the batteries G² G³ are connected with the batteries H H', and vice versa, and that at no time is there any electrical connection between the batteries H H' and the batteries E E'.

The circuit-changers B B' and F F' are shown in detail in Fig. 3 of the drawings, and, referring now to the said figures, it will be seen that all of the circuit-changers which may be employed at one station are conveniently mounted upon a single shaft, I, which is given a regular rotary motion in the direction of the arrow by means of a belt, $i$, which conveys power from any desired or available source. Each circuit-changer comprises four arms, $i'$ $i^2$ $i^3$ $i^4$, mounted upon the shaft I, upon rings $e$ $e$ $e$ $e$, surrounding said shaft, upon which rings bear brushes $m$ $m$ $m$ $m$, connecting by conductors $m'$ $m'$ $m'$ $m'$ with the terminals of batteries C' C² C³ C⁴. Four arc-shaped plates, K' K² K³ K⁴, are arranged concentrically with relation to shaft A and in such position that the ends of arms $i'$ $i^2$ $i^3$ $i^4$ will bear against their sides. The ends of plates K' K³ are separated some distance from the ends of plates K² K⁴, and the two former are somewhat more than a half circle in extent, while the two latter are somewhat less, for the purpose of preventing the generator-circuit, or the circuit of battery H, from being broken at any period, as such breaking of the current would result in injury to the generator, or would cause the lights being supplied to flicker.

The secondary batteries or accumulators which I propose to employ in connection with the above-described apparatus are exceedingly simple in form and inexpensive, comprising merely bent plates of lead immersed in acidulated water, and one of such batteries is illustrated in Fig. 3 of the drawings, in which $m^2$ $m^2$ $m^2$ designate the separate cups of the battery and N N N "U-shaped" plates of lead, having one leg immersed in the liquid of one of the cells, M, and the other leg in the cell next adjoining. I employ this simple type of cell because of its inexpensiveness and durability, and I am enabled to use it, by reason of the fact that the batteries are required to maintain a constant or working potential for but a short space of time, as they are being constantly charged and discharged at brief intervals, depending, of course, only on the rate of revolution of the circuit-changers.

While I have shown and described but two sets of generators, circuit-changers, and secondary batteries at the generating-station and an equal number of the same at the receiving-station, I do not limit myself to such, as their number may be increased to any desired extent without departing from the spirit of my invention.

In Fig. 2 of the drawings I have illustrated a modification of the distributing system, in which, while the batteries H H' are being charged from the batteries E E', a third distributing-battery, H³, is being charged from both batteries, appropriate circuit-changers and transferring-batteries, G⁴, G⁶, &c., being provided. In this case the battery H³ is receiving twice the quantity of current that one of the batteries H' or H receives, but at the same pressure of electro-motive force.

Operation: The parts, being constructed and arranged as described, operate as follows: The generators and the circuit-changers at the generating and distributing stations having been set in motion, the current of each generator flows into its appropriate secondary battery—say C—and upon the revolution of the circuit-changer battery C discharges its current into battery D with a counter electro-motive force somewhat less than the electro-motive force of the generator. At the same instant battery C², having been charged from generator A', is discharging into battery D', and the batteries D D', being arranged in series upon the main line 1, a current is imposed on said main conductor, whose electro-motive force is equivalent or nearly equivalent to the sum of the electro-motive force of both the generators A and A'. The current from main line 1 is delivered to the receiving-batteries E E' and from these is delivered by circuit-changers F F' and transferring-batteries G G' G² G³ to the storage-batteries H' H², from whence it is delivered to points of consumption.

It will be observed from the foregoing description that at no part of the line which is in any way liable to be exposed is the current of high electro-motive force. At the generating-station the highest electro-motive force of the current traversing the lines $a$ $a'$ and $c$ $c'$, or the lines $a^2$ $a^3$ and $c^2$ $c^3$, is that of one of the dynamos A or A', whereas if the dynamos A A' were arranged in series and current were conveyed directly to the line 1 and 2 the conductors conveying such current would be as dangerous and as difficult to properly insulate as the main-line conductors 1 and 2.

Having described my invention, I claim—

1. The herein-described method of distributing and transmitting electricity, which consists in producing two or more currents of low electro-motive force, transferring such currents at intervals of time to reservoirs disconnected from the generator-circuits, again transferring such currents to reservoirs connected with a main line, and finally combining the said currents to form a current of high electro-motive force, and conveying the said current over said main line, substantially as described.

2. The herein-described method of transmitting and distributing electricity, which consists in conveying a current of high electro-motive force over a main line, then converting said current to one or more currents of lower electro-motive force, then transferring such currents to reservoirs, and finally transferring said currents at intervals to distributing-reservoirs disconnected from the main line, substantially as described.

3. The method of transmitting and distributing electricity, consisting in dividing a current of high electro-motive force between several sets of secondary batteries, then transferring current from such sets of batteries individually to two other sets of similar batteries at alternate intervals, and during such intervals transferring current to distributing-batteries electrically isolated from the main conductor, substantially as described.

4. The method of transmitting and distributing electricity, consisting in conveying currents of high electro-motive force to points of consumption by main conductors, and there dividing said current and reducing its electro-motive force and transferring it to distributing-batteries at alternate intervals of time, substantially as described.

5. The method of distributing and transmitting electricity, consisting in producing two or more currents of low electro-motive force, transferring such currents at intervals of time to reservoirs disconnected from the generator-circuits, again transferring such currents to reservoirs connected with a main line and combining the said currents to form a current of high electro-motive force, then conveying said current of high electro-motive force over the main line and dividing it into currents of lower electro-motive force, then transferring such currents to reservoirs connected to the main line, and finally transferring said currents at intervals to distributing-reservoirs disconnected from the main line, substantially as described.

In testimony that I claim the foregoing I have hereunto set my hand this 2d day of August, 1888.

STANLEY C. C. CURRIE.

Witnesses:
FRANCIS D. LEWIS,
MORRIS R. BOCKIUS.